Feb. 13, 1923.
J. B. HENDERSON
GYROSCOPIC COMPASS
Filed Nov. 8, 1919
1,445,279
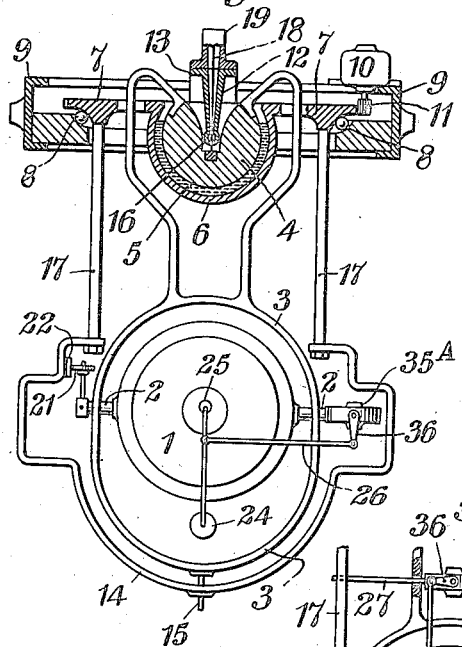
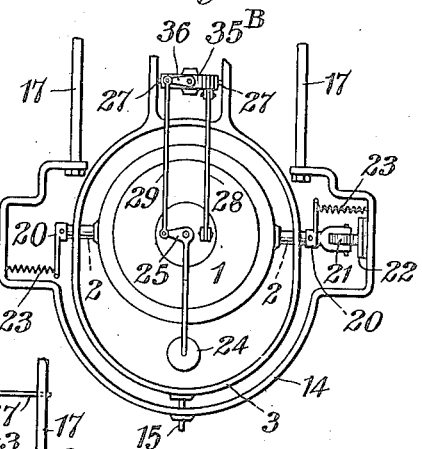
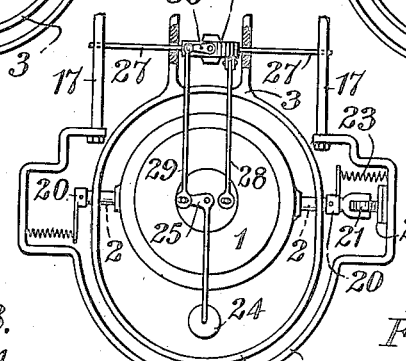
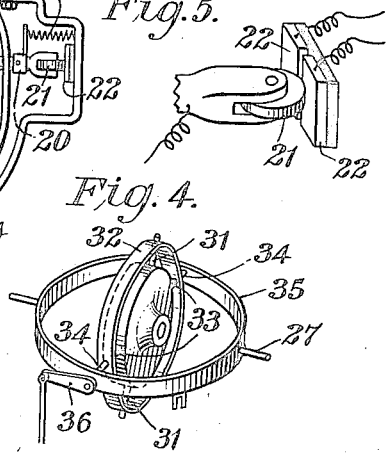
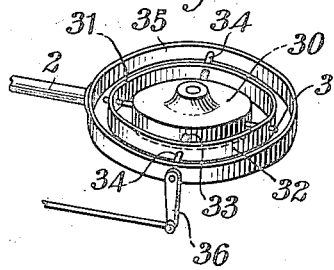
INVENTOR.
James B. Henderson
BY Moakley and Gill
ATTORNEYS.

Patented Feb. 13, 1923.

1,445,279

UNITED STATES PATENT OFFICE.

JAMES BLACKLOCK HENDERSON, OF LEE, ENGLAND.

GYROSCOPIC COMPASS.

Application filed November 8, 1919. Serial No. 336,624.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, subject of the King of Great Britain, residing at 2 Cambridge Road, Lee, in the county of Kent, England, have invented certain new and useful Improvements in Gyroscopic Compasses (for which I have filed an application in England, No. 14,486, June 16, 1914), of which the following is a specification.

My invention relates to gyroscopic compasses, more particularly of the floating type, and has for its object to improve such compasses with respect to the damping of the oscillations of the compass about the meridian and also with respect to the reduction of the deviation of the compass due to rolling of the ship.

As described in my prior British application No. 26,160 of 1913, I mount the gyroscope casing in neutral equilibrium on horizontal trunnions in a frame which is carried by a float supported in a bath of mercury and I impart stability to the rotor casing by means of a pendulum pivoted about an axis preferably coaxial with the rotor, the bob of the pendulum being in the central plane of rotation of the rotor. To reduce the deviation when on an intercardinal course due to rolling of the ship I arrange the period of the pendulum which imparts stability to the rotor casing so that it does not agree with the period of roll of the ship or with any harmonic present in that roll. This condition is most certainly attained by making the period of the pendulum longer than the period of roll of the ship. In my prior British application No. 26,160 of 1913 I have described means for accomplishing this result.

The object of this invention is to provide improved means for lengthening the period of the pendulum and to this end it consists in employing an auxiliary gyroscope constrained by springs which is linked to the pendulum in such a manner that any oscillation of the pendulum produces a forced precession of the gyroscope.

This arrangement of gyroscopic pendulum is also applicable to compasses of the Foucault type.

In both types I may also arrange this auxiliary gyroscope so that it damps the oscillation of the compass about the meridian thus serving the purpose of the tension or torsion elements.

Fig. 1 is an elevational view showing an arrangement of parts of a mercury supported compass in which the damping is produced by a torsion wire; it also shows one disposition of the auxiliary gyroscope;

Fig. 2 is a similar view with the upper portion broken away and shows an arrangement of parts of the same compass in which the damping is produced by tension elements; it also shows a different disposition of the auxiliary gyroscope from that shown in Fig. 1;

Fig. 3 is a perspective view showing the arrangement of the auxiliary gyroscope in its gimbal rings;

Fig. 4 is another perspective view which shows an arrangement of the auxiliary gyroscope which I use when I require this auxiliary gyroscope to damp the oscillations of the main compass.

Fig. 5 is a perspective view showing the commutator and the roller associated therewith; and Fig. 6 is a view similar to Fig. 2 but showing an auxiliary gyroscope mounted in a different manner.

In Fig. 1 the gyroscope rotor casing 1 is supported on the horizontal trunnions 2 in the frame 3 which is attached rigidly to the ball 4, which floats in the mercury 5 contained in the bowl 6 rigidly attached to the compass card 7. The card 7 is supported on the ball race 8 carried by the ring 9 which is supported in the binnacle on the usual gimbal pivots. The card 7 is turned by the little electric motor 10, the pinion 11 gearing with the teeth cut on the periphery of the card 7. The ball 4 is kept central in the bowl 6 by the mercury and by the ball 16 fixed to the lower end of the tube 12 which is carried by the bridge piece 13, the bridge piece being fixed to the card 7. The ball 16 engages with the wall of a vertical hole in the ball 4. The frame 14 is rigidly attached to the card 7 by the rods 17 and forms part of the following mechanism. It is kept central with the frame 3 at the bottom by means of the pin 15 attached to frame 3 and turning in a bearing in frame 14.

I impart the necessary stability to the rotor casing 1 by means of the pendulum 24 which can only oscillate about the axis 25 attached to the rotor casing and coaxial with the rotor, its natural period of oscillation about that axis being long compared with the period of roll of a ship or I may employ any of the other pendulums described in my former British application No. 26,160 of 1913 or in my co-pending United States application, Serial No. 336,627, filed November 8, 1919.

In order to damp the oscillation about the meridian by means of a torsion element I fix a torsion wire 18 so that its lower end is rigidly attached to the ball 4 and its upper end to the cap 19 which is fixed to the bridge piece 13. The wire passes down through the tube 12 and through a vertical hole in the ball 16. The switch which actuates the motor 10 consists of the contact roller 21 carried by the trunnion 2 bearing on a two part commutator 22 attached to the frame 14. The twist in the wire 18 is produced by the contact roller 21 being above the centre of the trunnion 2 so that when the axis of the gyroscope 1 becomes tilted in the vertical plane relatively to its normal approximately horizontal position the roller makes contact on one or other part of the commutator and the motor 10 causes a displacement between the frame 14 and the rod 17 on the one hand and the frame 3 on the other hand. As a result of this displacement the wire 18 is twisted, thus applying a damping torque about the vertical axis of the gyroscope.

The oscillation of the compass about the meridian is damped by means of tension elements, as illustrated in Fig. 2. Two vertical cranks 20 are fixed to the trunnions 2, one crank projecting upwards and the other downwards as shown and I fix two springs 23 or other tension elements such as loops of loaded cord, between the ends of the cranks and the frame 14. The contact roller 21 and commutator 22 are in this arrangement on the level of the centre of trunnion 2.

As there is a probability of the period of oscillation of the pendulum 24 synchronizing with the period of the roll of the ship or with a harmonic which is present in the roll, I increase the period of the pendulum 24 so as to make it greater than the period of roll of the ship. The above described features form no part of my present invention. According to this invention the period of the pendulum 24 is increased by means of an auxiliary gyroscope.

The arrangement of the auxiliary gyroscope is shown in Figs. 3 and 4. The gyroscope casing 30 is mounted on the trunnions 31 in the gimbal ring 32 and is constrained in that ring by two springs 33 so that the axis of the rotor is normally perpendicular to the plane of the ring 32. The ring 32 is mounted on the trunnions 34 which are supported in bearings in the ring 35 and to the trunnion 34 the crank 36 is attached which is connected by a suitable connecting rod to the pendulum 24. Fig. 1 shows one arrangement of the mounting of the auxiliary gyroscope, in which the ring 35, located at 35$^A$, is shown fixed to the end of the trunnion axis 2 and the crank 36 is connected by the horizontal connecting rod 26 with the pendulum 24.

An alternative position is shown in Fig. 2 in which the ring 35, here placed at 35$^B$, is fixed to the frame 3 preferably being mounted on trunnions 27 in the frame. The plane of the ring 35 is then kept parallel to the axis of the main gyroscope by a connecting rod 28 and the horizontal crank 36 on the trunnion axis 34 is connected by the connecting rod 29 with the corresponding small crank 25 on the pendulum 24. The trunnion axis 27 might be carried by the two rods 17 after passing through clearance holes in the frame 3, as shown in Fig. 6, in which case the weight of the auxiliary gyroscope and the secondary disturbing forces which it introduces would be taken by the following mechanism.

The axis of the rotor of the auxiliary gyroscope 30 might be either vertical as shown in Fig. 3 or horizontal as shown in Fig. 4. The former is to be preferred if the sole object of the gyroscope is to lengthen the period of the pendulum 24. The latter has the advantage that when the main gyroscope oscillates about the meridian the auxiliary gyroscope introduces damping couples of the same sign and phase as those introduced by the springs 23, because when the north end of the axis of the main gyroscope rises above its standard position, it precesses towards the east, taking the small gyroscope with it. The couple necessary to force the small gyroscope to precess with the larger one can only come through the trunnion axis 34, hence the pendulum 24 becomes inclined to the vertical, and if the direction of rotation of the small rotor is properly chosen this inclination moves the pendulum bob to the west and the required damping couple is produced by gravity.

Having now particularly described and ascertained the nature of my said invention and in what manner the same is to be performed, I declare that what I claim is:—

1. The combination with a craft adapted to move and having a period of roll, of a gyroscopic compass, comprising a main gyroscope, a pendulous mass associated with the main gyroscope and having a period of oscillation which is relatively long as compared with the period of rolling of the craft, and an auxiliary gyroscope associated with the pendulous mass for increasing the period of oscillation of the latter.

2. In a gyroscopic compass, the combination of a rotor, a rotor casing pivotally supported about axes lying at right angles to each other, a pendulous mass supported adjacent to the rotor casing, an auxiliary gyroscope supported in alignment with one of the supporting axes and means responsively connecting the mass to said auxiliary gyroscope.

3. In a gyroscopic compass, the combination of a gyroscope comprising a rotor and a casing therefor, a pendulum for imparting stability to the rotor casing, an auxiliary gyroscope, and means controllingly connecting the latter to the pendulum for damping the oscillations of the compass about the meridian by deflecting the pendulum.

4. In a gyroscopic compass, the combination of a gyroscope comprising a rotor and a casing therefor mounted upon a horizontal axis, a pendulum for imparting stability to the rotor casing, and an auxiliary gyroscope provided with outer and inner frames and having its outer frame parallel to the horizontal axis and its inner frame connected with the pendulum.

5. In a gyroscopic compass, the combination of a gyroscope supported upon vertical and horizontal axes, a pendulum for imparting stability to the rotor casing of the gyroscope, an auxiliary gyroscope having outer and inner rings, means for maintaining the plane of the outer ring of the auxiliary gyroscope parallel to the horizontal axis of the main gyroscope, and a connection between the inner ring of the auxiliary gyroscope and the pendulum.

6. In a gyro-compass, a rotor and rotor bearing frame, means for mounting said frame so as to be free to turn about a vertical axis and for oscillation about a horizontal axis, a pendulum pivoted to said frame so as to oscillate freely about an axis substantially perpendicular to said horizontal axis but connected to move with the frame about said axis, an auxiliary gyroscope provided with a rotor and an outer frame and having its outer frame parallel to the horizontal axis and with its rotor mounted upon horizontal precession and vertical spinning axes, and a connection between the auxiliary gyroscope and the pendulum.

7. In a gyro-compass, a rotor and rotor bearing frame, means for mounting said frame so as to be free to turn about a vertical axis and for oscillation about a horizontal axis, a pendulum pivoted to said frame so as to oscillate freely about an axis substantially perpendicular to said horizontal axis but connected to move with the frame about said axis, an auxiliary gyroscope provided with a rotor and an outer frame and having its outer frame parallel to the horizontal axis and with its rotor mounted upon horizontal spinning and precession axes, and a connection between the auxiliary gyroscope and the pendulum.

8. In a gyro-compass, a rotor and rotor bearing frame, means for mounting said frame so as to be free to turn about a vertical axis and for oscillation about a horizontal axis, a pendulum pivoted to said frame so as to oscillate freely about an axis substantially perpendicular to said horizontal axis but connected to move with the frame about said axis, an auxiliary gyroscope and means operatingly connecting the latter with said pendulum to stabilize it about its axis of oscillation.

Dated this 6th day of October, 1919.

JAMES BLACKLOCK HENDERSON.